United States Patent
Tay et al.

(10) Patent No.: US 7,148,975 B2
(45) Date of Patent: Dec. 12, 2006

(54) METHOD AND APPARATUS FOR IMPROVING DATA CONVERSION EFFICIENCY

(75) Inventors: Rodney C. Y. Tay, Vancouver, WA (US); Feng Yuan, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1583 days.

(21) Appl. No.: 09/841,367

(22) Filed: Apr. 23, 2001

(65) Prior Publication Data

US 2002/0154324 A1 Oct. 24, 2002

(51) Int. Cl.
*G06F 3/12* (2006.01)
*H04N 1/60* (2006.01)
(52) U.S. Cl. ...................... 358/1.13; 358/1.9
(58) Field of Classification Search ........... 358/1.1, 358/1.9, 1.13, 1.14, 1.15, 1.18, 2.1, 3.01, 358/3.07, 3.12
See application file for complete search history.

(56) References Cited

U.S. PATENT DOCUMENTS 6,144,458 A * 11/2000 McLachlan et al. ....... 358/1.15
6,930,803 B1 * 8/2005 Suzuki ....................... 358/471

OTHER PUBLICATIONS

Hewlett-Packard Company, Patent Application "Printer Driver For Generating A Reduced Printer Description File," U.S. Appl. No. 09/379,831, Filed on Aug. 24, 1999.

* cited by examiner

*Primary Examiner*—Douglas Q. Tran
(74) *Attorney, Agent, or Firm*—Gregg W. Wisdom (57) ABSTRACT

A driver module can perform a conversion from a device dependent bit map to a device independent bit map. The driver module includes a configuration to compare a previously received device dependent bit map to a most recently received device dependent bit map. If the two bit maps are equivalent, the driver module generates a printer control language file for an imaging operation using a device independent bit map previously generated from the previously received device dependent bit map. If the two bit maps are not equivalent, the driver module generates a printer control language file for an imaging operation using a device independent bit map generated from the most recently received device dependent bit map.

20 Claims, 6 Drawing Sheets

METHOD AND APPARATUS FOR IMPROVING DATA CONVERSION EFFICIENCY

FIELD OF THE INVENTION

This invention relates to the management of data by a printer driver. More particularly, this invention relates to a method and apparatus to improve the efficiency of data conversion.

BACKGROUND OF THE INVENTION

Printer driver software modules typically perform conversions of data originating from an application program operating upon a computer to a compatible with an imaging device, such as an inkjet printer or an electrophotographic imaging device. In some situations the process of data conversion can require considerable time. A need exists for improved conversion efficiency in printer driver software modules.

SUMMARY OF THE INVENTION

Accordingly, a method for operating a driver used in forming an image on media has been developed. The method includes generating a second set of data from a first set of data and storing the second set of data. The method further includes comparing the first set of data to a third set of data and generating a fourth set of data from the third set of data, if a difference exists between the first set of data and the third set of data. In addition, the method includes retrieving the second set of data, if equivalency exists between the first set of data and the third set of data.

A computer includes a memory. In addition, the computer includes a processing device configured to execute a set of instructions for generating a first device independent bit map from a first device dependent bit map. The set of instructions includes a configuration for storing the first device independent bit map in the memory, for comparing the first device dependent bit map to a second device dependent bit map and for generating a second device independent bit map from the second device dependent bit map if a difference exists between the first device dependent bit map and the second device dependent bit map. The set of instructions also includes a configuration for retrieving the first device independent bit map the memory if equivalency exists between the first device dependent bit map and the second device dependent bit map.

A storage device includes a computer readable medium. In addition, the storage device includes processor executable instructions stored on the computer readable medium configured to generate a second set of data from a first set of data and store the second set of data. Furthermore, the processor executable instructions are configured to compare the first set of data to a third set of data and generate a fourth set of data from the third set of data if a difference exists between the first set of data and the third set of data. Additionally, the processor executable instructions are configured to retrieve the second set of data if equivalency exists between the first set of data and the third set of data.

DESCRIPTION OF THE DRAWINGS

A more thorough understanding of embodiments of the driver module may be had from the consideration of the following detailed description taken in conjunction with the accompanying drawings in which.

Shown in FIG. 1 is a conceptual block diagram of a system for forming images on media including an embodiment of the driver module.

Shown in FIG. 2A and FIG. 2B are high level block diagrams of a computer upon which an embodiment of the driver module can operate and an imaging device coupled to the computer.

Shown in FIG. 2C is an embodiment of a computer readable medium.

Shown in FIG. 3A

DETAILED DESCRIPTION OF THE DRAWINGS

Although an embodiment of the driver module will be discussed in the context of an inkjet imaging device, such as an inkjet printer, it should be recognized that embodiments of the driver module could be used with other types of imaging devices, such as electrophotographic imaging devices.

Figure 1:
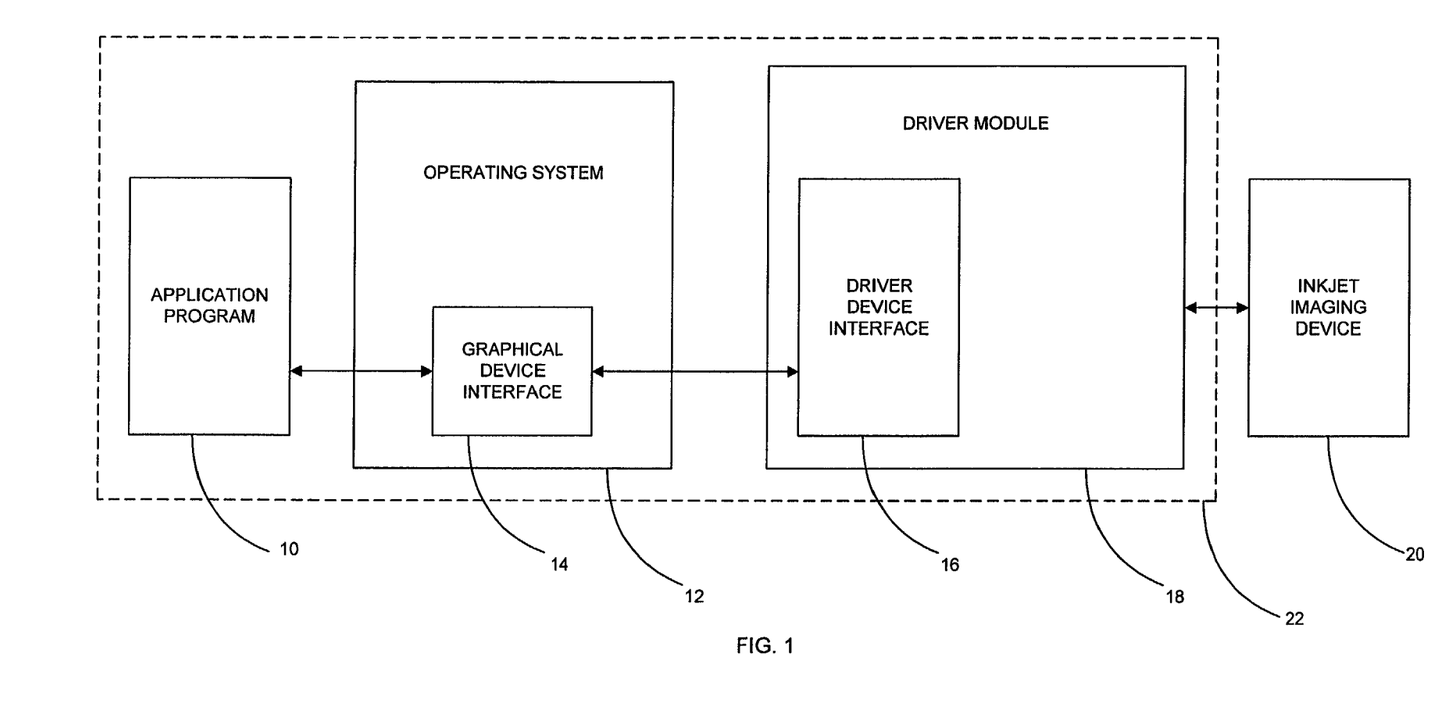

Shown in FIG. 1 is a conceptual block diagram illustrating the operation of an embodiment of the driver module. Application program 10 includes a configuration to a generate device dependent bit map or a device independent bit map from data entered by the user or data accessed by application program 10 from a storage device. A device independent bit map includes an array of bits corresponding to an image and data specifying the width and the height of the image, color specifications of the device used to create the image, and the resolution of the device used to create the image. Generally, a device independent bit map include its own color table and therefore can be used to display the image on a variety of devices. A device dependent bit map is similar to a device independent bit map with the exception that it does not include its own color table and therefore can be used only with a particular display or printer.

The data entered by the user or the data accessed by application program 10 forms a document file. The device dependent bit maps and the device independent bit maps generated from the document file are passed to operating system 12 through graphical device interface 14 included within operating system 12 after an imaging operation is initiated. Graphical device interface 14 performs the necessary interface functions between operating system 12 and application program 10.

Graphical device interface 14 is a subsystem operating within operating system 12 used for displaying images on display devices (such as video monitors) and on imaging devices (such as an inkjet printer). When application program 10 displays an image it makes use of graphical device interface 14. Application program 10 passes device independent bit maps and device dependent bit maps through graphical device interface 14 to the device drivers for the display devices and the imaging devices. By acting as an interface between display devices and imaging devices, graphical device interface allows application program 10 to supply data in a device independent format to display and imaging devices that use of data in a device dependent format, thereby simplifying the operation of application program 10.

Graphical device interface 14 passes the device dependent bit maps or the device independent bits maps from application program 10 to driver device interface 16 included within an embodiment of a driver module, driver module 18.

Driver device interface 16 performs the necessary interface functions between graphical device interface 14 and the remaining functionality within driver module 18. The functionality associated with driver device interface 16 is selected based upon the specific type of operating system 12 used. The remaining functionality within driver module 18 is selected independent of the specific operating system 12. Driver module 18 includes a configuration to perform a conversion of the data it receives into a form useable by an imaging device, such as inkjet imaging device 20. The converted data is passed to inkjet imaging device 20 for forming an image corresponding to the data from application program 10.

The result of the conversion performed by driver module 18 generates a file in a format useable by the image device to define each of the pixels forming the image. Inkjet imaging device 20 uses the data defining the pixels to eject colorant onto media in a manner that creates the image corresponding to the device dependent or device independent bit maps generated from the document file by application program 10. The image may include, for example, text, pictures, or graphics. It should be recognized that although in FIG. 1, driver module 18 operates within computer 22, it would be possible to locate the functionality associated with driver module 18 in an imaging device. In that case, the imaging device would include additional processing capability to perform the functions associated with driver module 18. The benefit to this implementation would be a reduced burden upon the processing resources of computer 22, thereby improving the performance of computer 22. However, the additional processing capability would likely add cost to the imaging device.

On a specific imaging operation, application program 10 may generate only device independent bit maps, device dependent bit maps or a mix of these types of bit maps. The data forming the bit maps may include data defining each pixel of the image to be formed, primitives defining the image to be formed, or a mix of pixel data and primitives. Primitives are constructs that define objects of specific shapes and sizes. At the start of each imaging operation, application program 10 queries driver module 18 through graphical device interface 14 to determine the type of primitives supported by driver module 18. Based upon the results of this query, application program 10 determines how to generate the device independent bit maps or the device dependent bit maps. Where applicable, application program 10 will generate primitives supported by driver module 18. The primitives generated in a specific imaging operation by application program 10 will vary depending upon the image that is to be formed.

Primitives define certain shapes such as circles, rectangles and other polygons. Polygons include shapes having three or more sides of any and not necessarily equal lengths. Complex images and graphics can be decomposed into polygon shapes. The size and shape and location of the primitive are defined by a set of parameters that are passed from application program 10 to driver module 18 through graphical device interface 14. The use of primitives to define images and graphics allows for more efficient performance of imaging operations. By defining images and graphics in terms of primitives (at least to the extent supported by driver module 18) a smaller amount of data is generated by application program 10 than would have to be generated if the device independent or device dependent bit maps were required to generate data for each pixel in the image or graphics.

Application program 10 generates pixel data (for those parts of image, graphics, or text that are not expressed as primitives) that can have up to 24 bits per pixel. The 24 bits are typically used to specify an RGB color value (with 8 bits per primary color). Driver module 18 typically performs the color space conversion necessary to translate the pixel data from an RGB color space to the CMYK color space frequently used within inkjet imaging devices.

When an imaging operation is initiated by the user through application program 10, graphical device interface 14 receives graphics commands from application program 10. Graphical device interface 14 translates these graphics commands into commands useable by driver module 18. If the command set supported by graphical device interface 14 is different than that supported by driver module 18, the translation will be performed so that equivalent commands useable by driver module 18 are generated. The device independent bit maps and the device dependent bit maps are passed through the graphical device interface 14 to driver device interface 16. With respect to the commands generated for execution within driver module 18, the device independent bit maps and the device dependent bit maps can be regarded as parameters upon which these commands operate.

The commands generated for driver module 18 are executed in a way that distributes the processing time for these commands so that the processor execution time within the host computer is not completely consumed by execution of these commands. The commands generated by graphical device interface 14 for driver module 18 are stored in memory associated with driver module 18. Then, at a later time, these commands are executed. The functionality of driver module 18 external to driver device interface 16 is used to execute these commands. The execution of these commands is done in the background so that control can be returned to the user executing application program 10. The device dependent bit maps, the device independent bit maps, and the primitives passed through graphical device interface 14 and the associated commands generated by graphical device interface 14 are included in the page description language (PDL) file delivered to driver module 18. Driver module 18 executes the commands delivered to it using the data delivered, in the background, to it to generate a printer control language (PCL) file. This printer control language file is then delivered to inkjet imaging device 20 through an interface. Using the PCL file, inkjet imaging device 20 renders the image. The rendering operation performed in inkjet imaging device 20 includes determining which color ink drops are to be ejected onto the pixels to form the image corresponding to the PCL file. After rendering the image, inkjet imaging device 20 forms the image onto media.

Part of the function of driver module 18 is to perform a conversion from a device dependent bit map to a device independent bit map when application program 10 provides a device dependent bit map through graphical device interface 14 to driver device interface 16. The operations performed by driver module 18 upon bit maps executing the commands generated by graphical device interface 14 are intended to be performed upon device independent bit maps. Hence, the necessity of converting from device dependent bit maps to device independent bit maps. The conversion from the device dependent bit maps, received from graphical device interface 14, to the device independent bit maps is done in driver module 18 by the functionality associated with driver device interface 16. However, it should be recognized that in other embodiments of driver module 18 this functionality could be placed elsewhere within driver module 18. The result of the conversion from a device dependent bit map to a device independent bit map is saved in memory associated with driver device interface 16. In addition, the device dependent bit map received from graphical device interface 14 is also saved in memory.

To improve the efficiency of the imaging operation, driver device interface 16 includes a capability to determine whether the most recently received device dependent bit map has previously been converted to a device independent bit map. The device dependent bit map most recently received from application program 10, through graphical device interface 14 by driver device interface 16, is compared, data value by data value, with the previously received device dependent bitmap using functionality associated with driver device interface 16. If the previously received device dependent bitmap and the most recently received device dependent bit map are identical, then no conversion is performed. Instead, the previously generated device independent bitmap is retrieved from memory and used in generation of the PCL file that will be delivered to inkjet imaging device 20 by driver module 18 when the commands are executed in driver module 18. However, if the previously received device dependent bitmap and the most recently received device dependent bit map are not identical, then the most recently received device dependent bit map is stored in memory to replace the previously received device dependent bit. In addition, the most recently received device dependent bit map is converted to a device independent bit map through the operation of driver device interface 16 and the result is stored in memory to replace the previously stored device independent bit map.

A difference in only a single data value between the most recently received device dependent bit map and the previously received device dependent bit map will cause driver device module 16 to determine that the two device dependent bit maps are not identical. Therefore, where two device dependent bit maps are not identical, this will generally be determined fairly early in the comparison process so that a large quantity of computing resources are not generally consumed. However, determining that two device dependent bit maps are identical involves the comparison of all corresponding data values between the two device dependent bit maps. Nonetheless, where the most recently received and previously received device dependent bit maps are identical, a substantial net savings in processing time is realized because the conversion of the most recently received device dependent bit map to a device independent bit map is not necessary. Making use of this method to save processing time can provide a benefit for a variety of operating systems. However, the method works particularly well in reducing the processing time for computers using the WINDOWS 95 and WINDOWS 98 operating systems. For example, for a specific CorelDraw document using device dependent bit maps, the time interval between the launching of the imaging operation (by clicking the print button in the application) and the completion of the operations of driver module 18 has a measured time reduction from 10 minutes to 2 minutes.

Figure 2A:
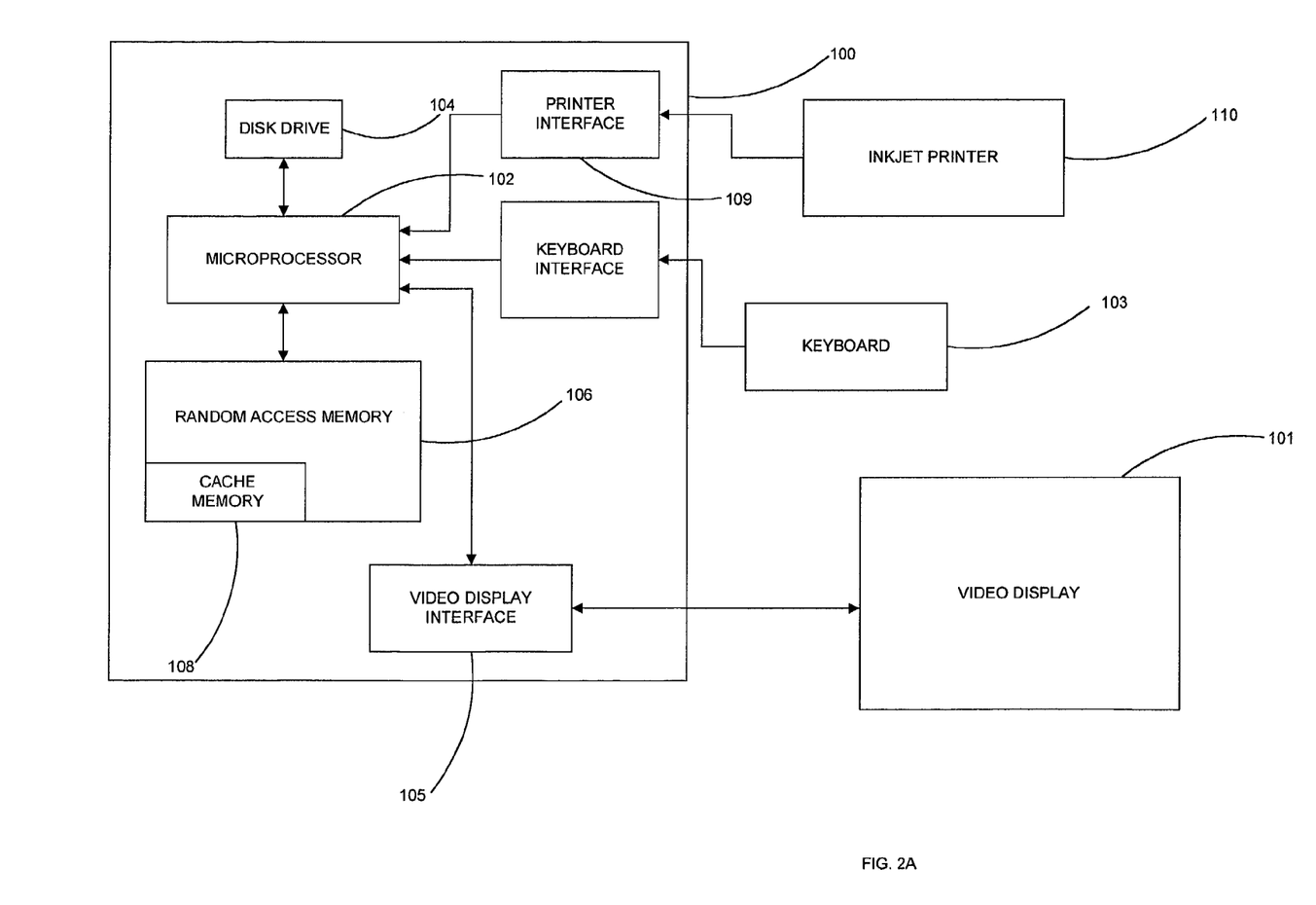

Shown in FIG. 2A is a high level block diagram of a system for forming an image on media that includes driver module 18. Computer 100 includes an embodiment of a processing device, such as microprocessor 102 for executing an application. The operating system is loaded from disk drive 104 into a memory, such as random access memory 106, through microprocessor 102 during power on of the system. The application is loaded from disk drive 104 into random access memory 106 upon starting the application. Microprocessor 102 executes the application from random access memory 106. Video display 101 provides the user with a visual interface to the application executed by microprocessor 102. The user controls the operation of the application through keyboard 103. Video display 101 is interfaced to microprocessor 102 through video display interface 105. Keyboard 103 is interfaced to microprocessor 102 through keyboard interface 107. Driver module 18 is stored in disk drive 104 and loaded into random access memory 106 in preparation for an imaging operation.

Random access memory 106 includes a portion reserved for use by driver module 18 for temporary storage of device dependent bit maps and device independent bit maps. Cache memory 108, included within random access memory 106, is used to store the results of the conversion from the device dependent bit map to the device independent bit map. In addition, cache memory 108 is used to store the device dependent bit map after the conversion to the device independent bit map is performed. When the next device dependent bit map is received, driver device interface 16 compares the most recently received device dependent bit map to previously received device dependent bit map stored in cache memory 108. Regardless of whether the comparison indicates that they are the same or different, the most recently received device dependent bit map is stored in cache memory 108 after the comparison. If the comparison of the two device dependent bit maps determines that they are identical, driver module 18 uses the previously computed result for the device independent bit map in the generation of the PCL file (used to form the image within inkjet printer 110) using the commands generated by graphical device interface 14, instead of repeating the conversion. Microprocessor 102 sends the PCL file generated by driver module 18 through printer interface 109 to inkjet printer 110.

Figure 2B:
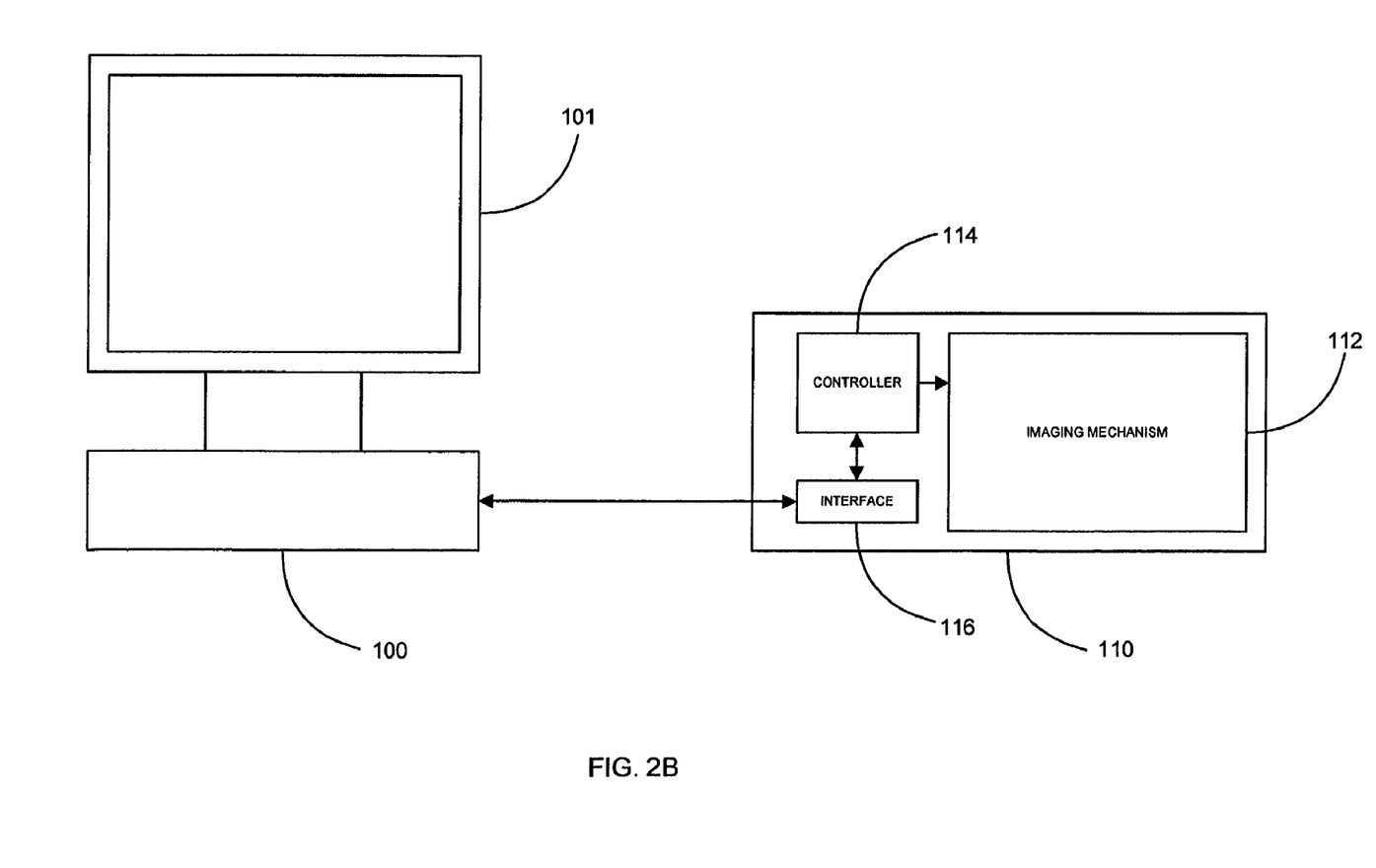

Shown in FIG. 2B is another high level block diagram representation of the system used for forming an image on the media showing greater detail for inkjet printer 110. Although inkjet printer 110 is shown in this system it should be recognized that other types of imaging devices could be used, such as electrophotographic printers. Included in inkjet printer 110 is an embodiment of an imaging mechanism, imaging mechanism 112. Imaging mechanism 112 includes the hardware necessary to place colorant on media according to the file provided by computer 100. A controller, such as controller 114, coupled to imaging mechanism 112 controls the placement of colorant on media by imaging mechanism 112 according to the file provided by computer 100. The PCL file provided by computer 100 is passed through interface 116 to controller 114. Controller 114 may include a processing device, such as a microprocessor, or an application specific integrated circuit (ASIC). For a color inkjet imaging device, imaging mechanism 112 may include ink cartridges movably mounted on a carriage with its position precisely controlled by a belt driven by a stepper motor. An ink cartridge driver circuit coupled to the controller and the ink cartridges fires nozzles in the ink cartridges based upon signals received from the controller to place colorant on media according to the PCL file received from computer 100.

Figure 2C:
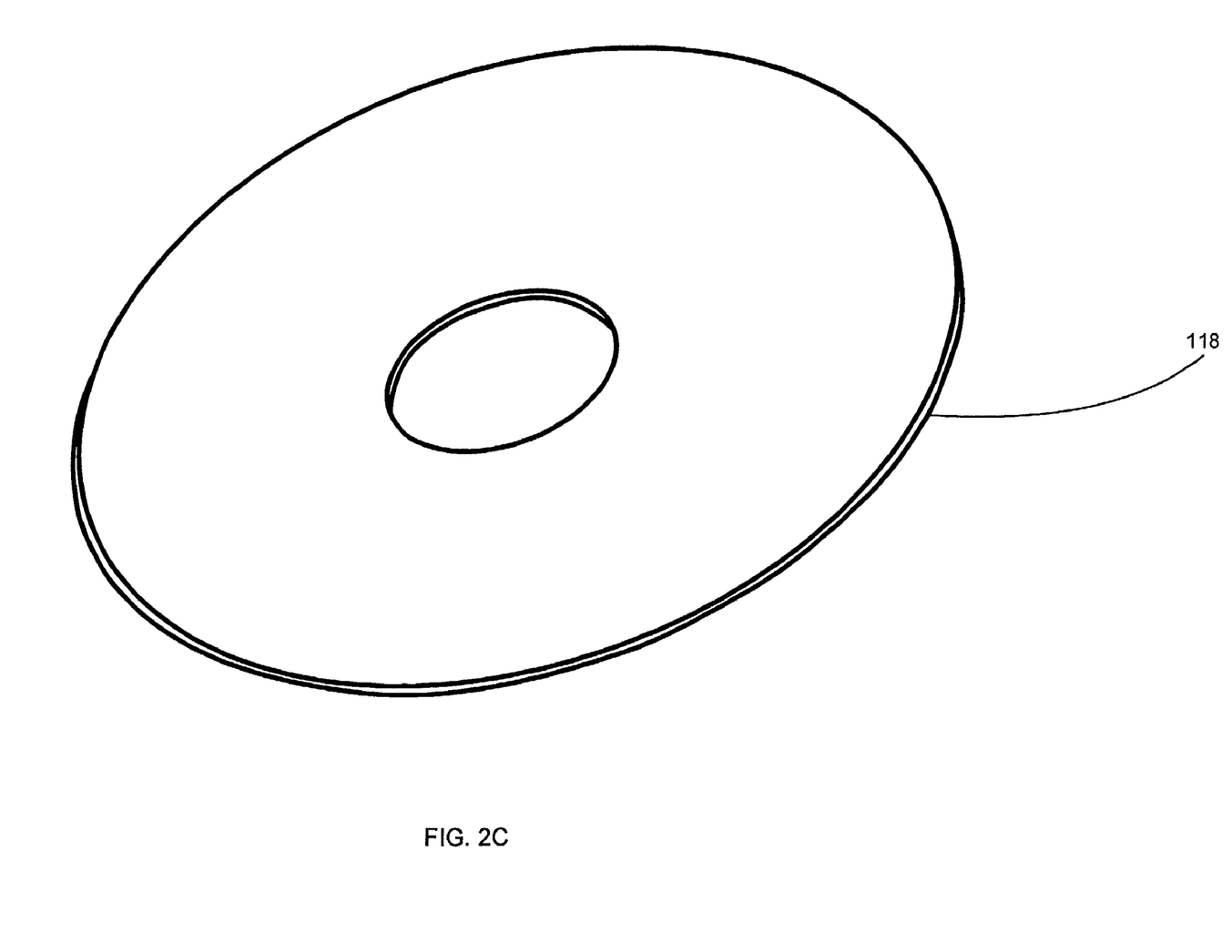

Shown in FIG. 2C is an embodiment of a computer readable medium, disk 118 on which an embodiment of driver module 18 is stored. Disk 118 could be, for example, a hard disk coated with magnetic material for use within disk drive 104 or a flexible disk coated with magnetic material for use within a floppy disk drive. Alternatively, disk 118 could be a compact disk for use in a CD-ROM drive.

Figure 3A:
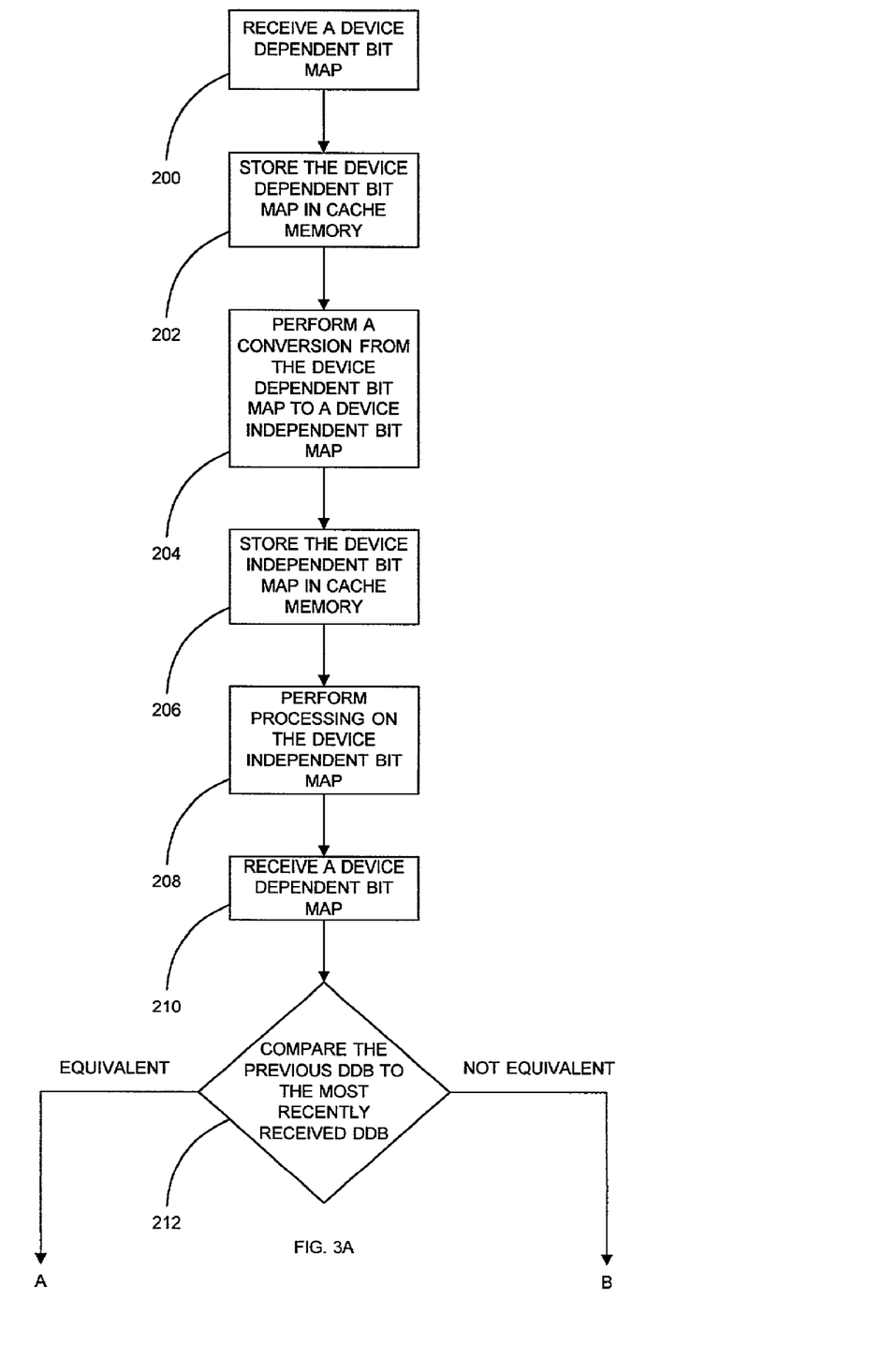
Figure 3B:
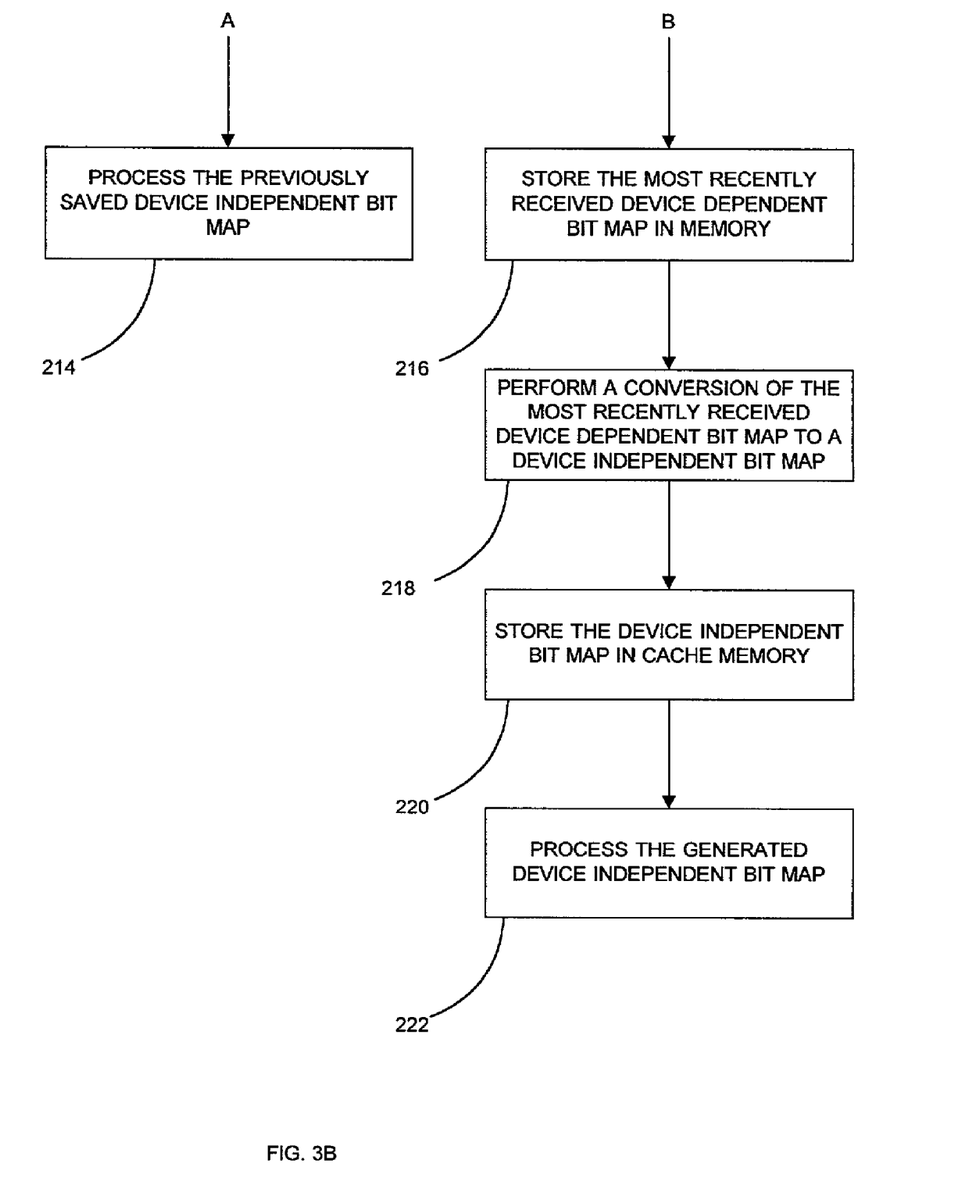
FIG. 3B is a high level flow diagram of the operation of an embodiment of the driver module.

Shown in FIG. 3A and FIG. 3B are high level flow diagrams of a method for improving the efficiency of driver module 18. First, in step 200, driver device interface 16 receives a device dependent bit map from graphical device interface 14. Next, in step 202, driver device interface 16 stores the device dependent bit map in cache memory 108. Then, in step 204, driver device interface 16 performs a conversion of the device dependent bit map to a device independent bit map. Next, in step 206, driver device interface 16 stores the device independent bit map in cache memory 108. Then, in step 208, driver module 18 processes the device independent bit map that was stored in cache memory 108 by executing the commands received from graphical device interface 14 for generation of the PCL file. Next, in step 210, driver device interface 16 receives another device dependent bit map from graphical driver interface 14.

Then, in step 212, driver device interface 16 compares the most recently received device dependent bit map with the device dependent bit map previously stored in cache memory 108. If the two device dependent bit maps are identical, then, in step 214, driver module 18 performs processing on the device independent bit map saved from the last conversion, previously stored in cache memory 108 in the generation of the PCL file. If the two device dependent bit maps are not identical, then, in step 216, driver module 18 stores the most recently received device dependent bit map in cache memory 108. Next, in step 218, driver device interface 16 performs a conversion from the device dependent bit map to a device independent bit map. Then, in step 220, the most recently generated device independent bit map is stored in cache memory 108. Finally, in step 222 driver module 18 performs processing of the most recently generated device independent bit map for the generation of PCL file by executing the commands received from graphical device interface 14.

Although an embodiment of the driver module has been illustrated, and described, it is readily apparent to those of ordinary skill in the art that various modifications may be made to this embodiment without departing from the scope of the appended claims.

What is claimed is:

1. A method for operating a driver used in forming an image on media, comprising:
   generating a second set of data from a first set of data;
   storing the second set of data;
   comparing the first set of data to a third set of data;
   generating a fourth set of data from the third set of data, if a difference exists between the first set of data and the third set of data; and
   retrieving the second set of data, if equivalency exists between the first set of data and the third set of data.

2. The method as recited in claim 1, wherein:
   the first set of data corresponds to a first device dependent bit map received by the driver;
   the second set of data corresponds to a first device independent bit map;
   the third set of data corresponds to a second device dependent bit map received by the driver; and
   the fourth set of data corresponds to a second device independent bit map.

3. The method as recited in claim 2, wherein:
   the driver executes on a computer.

4. The method as recited in claim 3, further comprising:
   generating control language code using the first device independent bit map if equivalency exists between the first device dependent bit map and the second device dependent bit map.

5. The method as recited in claim 4, further comprising:
   sending the control language code to the imaging device.

6. The method as recited in claim 4, further comprising:
   forming an image on the media using the control language code, with the imaging device including an inkjet imaging device.

7. The method as recited in claim 3, further comprising:
   generating a control language file using the second device independent bit map if the difference exists between the first device dependent bit map and the second device dependent bit map.

8. The method as recited in claim 7, further comprising:
   sending the control language file to the imaging device.

9. The method as recited in claim 8, further comprising:
   forming an image on the media using the control language file, with the imaging device including an inkjet imaging device.

10. A computer, comprising:
    a memory; and
    processing device configured to execute a set of instructions for generating a first device independent bit map from a first device dependent bit map, for storing the first device independent bit map in the memory, for comparing the first device dependent bit map to a second device dependent bit map, for generating a second device independent bit map from the second device dependent bit map if a difference exists between the first device dependent bit map and the second device dependent bit map, and for retrieving the first device independent bit map the memory if equivalency exists between the first device dependent bit map and the second device dependent bit map.

11. The computer as recited in claim 10, wherein:
    with the set of instructions corresponding to a first set instructions, the processor includes a configuration to execute a second set of instructions configured for generating the first device dependent bit map and the second device dependent bit map; and
    the processor includes a configuration to execute a third set of instructions for generating control language code, used in an imaging device, from the first device independent bit map and the second device independent bit map.

12. The computer as recited in claim 11, further comprising:
    a storage device coupled to the processing device for storing the set of instructions.

13. The computer as recited in claim 12, wherein:
    the memory includes random access memory.

14. The computer as recited in claim 13, wherein:
    the storage device includes a disk drive.

15. A storage device, comprising:
    a computer readable medium; and
    processor executable instructions stored on the computer readable medium configured to generate a second set of data from a first set of data, store the second set of data, compare the first set of data to a third set of data, generate a fourth set of data from the third set of data, if a difference exists between the first set of data and the third set of data, and retrieve the second set of data, if equivalency exists between the first set of data and the third set of data.

16. The storage device as recited in claim 15, wherein:
    the first set of data corresponds to a first device dependent bit map;
    the second set of data corresponds to a first device independent bit map;
    the third set of data corresponds to a second device dependent bit map; and the fourth set of data corresponds to a second device independent bit map.

17. The storage device as recited in claim 16, further comprising:

with the processor executable instructions corresponding to a first set of processor executable instructions, a second set of processor executable instructions stored on the computer readable medium and configured to generate control language code for an imaging device using the first device independent bit map if equivalency exists between the first device dependent bit map and the second device dependent bit map and the second device independent bit map if a difference exists between the first device dependent bit map and the second device dependent bit map.

18. The storage device as recited in claim 17, wherein: the computer readable medium includes a hard disk.

19. The storage device as recited in claim 17, wherein: the computer readable medium includes a flexible disk.

20. The storage device as recited in claim 17, wherein: the computer readable medium includes a compact disk.

* * * * *